United States Patent Office 3,300,461
Patented Jan. 24, 1967

3,300,461
ORGANIC PHOSPHIDE CATALYSTS IN ALPHA-OLEFIN POLYMERIZATION PROCESSES
Salvador Olivé and Gisela Olivé-Henrici, Zurich, Switzerland, assignors to Monsanto Company, a corporation of Delaware
No Drawing. Filed May 10, 1962, Ser. No. 193,862
Claims priority, application Switzerland, May 12, 1961, 5,616/61
7 Claims. (Cl. 260—89.5)

It has been found that α-olefines, substituted olefines, olefine oxides, aldehydes and ketones can be polymerized when alkali salts of phosphine or organic phosphines are used as a catalyst.

The alkali phosphides suitable as catalysts possess the general formula

$$R_nPM_{3-n}$$

In this formula M is an alkali metal atom such as sodium, potassium or lithium, R is an aliphatc cycloaliphatic, araliphatic, aromatic or heterocyclic radical. It may also be an unsaturated radical such as, for example, allyl, cyclohexenyl, etc., and/or have substituents such as, for example, halogen, alkoxy, ester, nitro, cyano groups etc.; however, preferred catalysts are those wherein R is an unsubstituted hydrocarbon radical and is free of non-benzenoid unsaturation, i.e. ethylenic or acetylenic unsaturation. Electron-withdrawing groups like halogen, nitro, cyano, etc., may cause a certain selectivity of the catalysts in that they respond rather to polar monomers such as, for example, acrylates, acrylonitrile, etc. The radical R together with the phosphorus to which it is attached may also form a heterocyclic structure, i.e. a phosphorus-containing ring. If two radicals R are present, they may be like or unlike. Preferably, R has not more than 18 carbon atoms, more preferably not more than 8 carbon atoms.

The organic phosphides may be primary or secondary phosphides, and in each case all hydrogen atoms on the phosphorus atom have to be replaced by alkali metal. In the formula set forth at beginning, $n$ is zero, one or two. Moreover, the radical R may contain a further

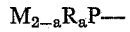

$$M_{2-a}R_aP—$$

group or be itself such a group In these cases the compounds in question are alkali salts of bis-phosphine or organic bisphosphines which contain the grouping P—P or P—R'—P and may be illustrated by the general formula

$$M_{2-a}(R_a)P—R'_b—P(R_a)M_{2-a}$$

In this formula M and R have the same significance as above, R' is a hydrocarbon radical, and $a$ and $b$ are a number zero or one. When R' is present it is preferably a hydrocarbon radical free of non-benzenoid unsaturation having not more than 8 carbon atoms, such as $CH_2$, $CH_2CH_2$ or phenylene.

In general, the organic phosphides and bisphosphides are the preferred polymerization catalysts. The choice of the catalysts will in many cases be made so they are soluble in the monomers to be polymerized or in the solvents employed.

The preparation of organic phosphides and bisphosphides is well known. In a preferred method, the organic, especially phenylated phosphides or the corresponding halides are treated with alkali metal. Phenylphosphine dichloride, diphenylphosphine chloride, bis-(phenylphosphine chloride) etc., are reacted in known manner in a solvent with a calculated amount of sodium, potassium or lithium. In the preparation of aliphatic substituted phosphides and bis-phosphides, there are preferably used alkali metal alkyls such as for example, butyl lithium, etc., instead of alkali metal. The same solvent may be used for the preparation of the alkali salts as for the polymerization and the salts such as NaCl, KCl, LiCl, etc., which are formed as by-products, do not necessarily have to be removed from the reaction mixture. However, if desired, the phosphides can be isolated.

It is understood that the catalysts, owing to their instability, must be protected against oxygen and moisture, during their preparation as well as use for the polymerization.

The novel catalysts are useful in place of common polymerization catalysts. They can successfully be used for the polymerization of numerous compounds. Examples of compounds which can be polymerized or co-polymerized according to the novel process are: ethylene, propylene, isopropylene, butene-1, isobutene-1, octene-1, dodecene-1, cyclohexene, cycloheptene, styrene, α-methylstyrene, allylbenzenes, vinylnapththalenes, etc.; butadiene, isoprene, piperylene, allene, diallyl, cyclopentadiene, cyclohexadiene-1,3, cycloheptadiene-1,3, divinylbenzene, squalene, dimethylfulvene, etc.; tetrafluorethene, vinylchloride, vinylidenechloride, vinylidenechlorofluoride, chloroprene, fluoroprene, fluorinated and chlorinated styrenes, etc.; acrylates, methacrylates, methacrylamides, acrylamides, vinylacetate, vinylstearate, acrylonitrile, methacrylonitrile, etc.; maleic acid, fumaric acid, maleic and fumaric acid esters, -amides, -nitriles, etc., vinylphthalimide, vinylpyridine, N-vinylcarbazol, N-vinylpyrrolidone, vinylcollidine, vinyllutidine, indene, etc.; ethylene oxde, propylene oxide, butylene oxide, styrene oxide, epichlorohydrin etc.; unsaturated ethers and thioethers, lactones, etc.; formaldehyde, acetaldehyde, crontonaldehyde, chloral, acrolein, methacrolein, butyraldehyde, stearaldehyde, benzaldehyde, furfuraldehyde, etc.; acetone, methylethylketone, stearone, etc.

The catalysts of invention are appropriately used in amounts ranging from 0.01 to 1%, preferably 0.1 to 0.5%, based on the weight of monomers used.

The novel catalysts which generally are characterized in that a P—alkali metal bond is present, are lying with respect to their catalytic activity between the compounds having a C—alkali metal bond and those having an O—alkali metal bond. As a rule, the phosphides proposed herein do not demand special modifications of the polymerization processes which are customarily used until now. The polymerization of the enumerated monomers can be carried out in conventional manner, with or without using pressure, at room temperature, higher or lower temperatures, and in presence or, depending on the circumstances, also in absence of a diluent.

Example 1

A flask is heated in vacuo at 100° C. and cooled under nitrogen. There are added 13 ml. of a solution of potassium diphenylphosphide in tetrahydrofurane ($27 \times 10^{-3}$ mole per liter) and 3 ml. of styrene. The mixture is stirred at 25° C. for 2 hours. Then, the solution is poured into methanol and the precipitated polymer filtered off. After drying there are obtained 2.25 g. polystyrene (=84% conversion). Molecular weight (viscosity average) 68,000. In this and all of the other examples oxygen and moisture are excluded from the reaction mixture.

Example 2

In a flask, prepared as in Example 1, there are added 13 ml. of a solution of sodium diphenylphosphide in tetrahydrofurane ($27 \times 10^{-3}$ mole per liter) and 3 ml. of methylmethacrylate. The mixture is stirred at 25° C. for 1 hour. Then, the solution is poured into petroleum ether and the precipitated polymer filtered off. After drying there are obtained 1.4 g. of polymethylmethacrylate (=50% conversion). Molecular weight (viscosity average) 31,000.

*Example 3*

In a flask, prepared as in Example 1, there are added 5 ml. of a solution of potassium diphenylphosphide in tetrahydrofurane ($1.4 \times 10^{-2}$ mole per liter) and 2 ml. of styrene. The mixture is stirred at 25° C. for 1 hour. There are obtained 1.8 g. of polystyrene (=100% conversion). Molecular weight (viscosity average) 215,000.

*Example 4*

In a flask, prepared as in Example 1, there are added 7 ml. of a solution of potassium diphenylphosphide in tetrahydrofurane ($1.4 \times 10^{-2}$ mole per liter). The tetrahydrofurane was then removed by evaporation and 7 ml. of styrene and 0.5 ml. of tetrahydrofurane were added to the flask. The mixture is stirred for 1 hour. There are obtained 4.48 g. of polystyrene (=70% conversion). Molecular weight (viscosity average) 510,000.

*Example 5*

In a flask, prepared as in Example 1, there are added 4 ml. of a solution of di-lithium phenylphosphide in tetrahydrofurane ($45 \times 10^{-2}$ mole per liter) and 2 ml. of styrene in 4 ml. of tetrahydrofurane. The mixture is stirred at 25° C. for 2 hours. There are obtained 1.26 g. of polystyrene (=70% conversion). Molecular weight (viscosity average) 53,000.

*Example 6*

In a flask, prepared as in Example 1, there are added 2 ml. of a solution of di-lithium phenylphosphide in tetrahydrofurane ($45 \times 10^{-2}$ mole per liter) and 2 ml. of methyl methacrylate in 6 ml. of tetrahydrofurane. The mixture is stirred at $-20°$ C. for 20 minutes. There are obtained 1.8 g. of polymethylmethacrylate (=100% conversion). Molecular weight (viscosity average) 210,000.

*Example 7*

A flask is heated in vacuo at 100° C. and cooled under argon. There are added 20 ml. of a solution of potassium diphenylphosphide in tetrahydrofurane ($1.35 \times 10^{-3}$ mole per liter) and 1 ml. of styrene. The mixture is stirred at 25° for 2 hours. There are obtained 0.9 g. of polystyrene (=100% conversion). Molecular weight (viscosity average) 220,000. From this example it can be seen, that by using pure argon instead of nitrogen, the necessary amount of catalyst can be smaller.

*Example 8*

In a flask, prepared as in Example 7, there are added 19 ml. of a solution of potassium diphenylphosphide in dioxane ($9.1 \times 10^{-3}$ mole per liter) and 1 ml. of styrene. The mixture is stirred at 25° C. for 2 hours. There are obtained 0.65 g. of polystyrene (=72% conversion). Molecular weight (viscosity average) 150,000. From this example it can be seen that the polymerization proceeds in dioxane considerably slower than in tetrahydrofurane (Example 7).

*Example 9*

In a flask, prepared as in Example 7, there is added 1 ml. of a solution of potassium diphenylphosphide in dioxane ($8 \times 10^{-2}$ mole per liter). The dioxane is evaporated in vacuo and replaced by 8 ml. of hexane. Then, 2 ml. of styrene are added. Neither the catalyst nor the polystyrene are soluble in hexane. On the surface of the catalyst there are formed at 25° C. reddish dendrites of polystyrene in about 25% yield after 3 days. After 30 days the conversion has been 100%. The color disappears on contact with air. Molecular weight (viscosity average) 800,000.

What is claimed is:

1. In a polymerization process wherein a monomer selected from the class consisting of α-olefinic compounds and ketones having not more than 35 carbon atoms and olefin oxides, lactones and aldehydes having not more than 18 carbon atoms is contacted at polymerizing temperatures with a polymerization catalyst to provide a polymeric product, the improved catalyst for the polymerization reaction which is a phosphide selected from the class consisting of compounds of the formulas $$R_nPM_{3-n} \text{ and } M_{2-a}(R_a)P-R'-P(R_a)M_{2-a}$$

wherein R and R' are hydrocarbon radicals free of non-benzenoid unsaturation, R has not more than 18 carbon atoms, R' has not more than 8 carbon atoms, M is selected from the class consisting of sodium, potassium and lithium, n is an integer of 1 to 2, and a is an integer from 0 to 1.

2. A process of claim 1 wherein an inert liquid solvent is used.

3. A process of claim 1 wherein R is the phenyl radical.

4. A process of claim 1 wherein an inert liquid solvent is used, said monomer is styrene and said catalyst is potassium diphenylphosphide.

5. A process of claim 1 wherein an inert liquid solvent is used, said monomer is styrene and said catalyst is di-lithium phenylphosphide.

6. A process of claim 1 wherein an inert liquid solvent is used, said monomer is methylmethacrylate and said catalyst is sodium diphenylphosphide.

7. A process of claim 1 wherein an inert liquid solvent is used, said monomer is methylmethacrylate and said catalyst is di-lithium phenylphosphide.

References Cited by the Examiner

UNITED STATES PATENTS

| | | | |
|---|---|---|---|
| 2,437,797 | 3/1948 | Walling | 260—606.5 |
| 2,828,286 | 3/1958 | MacDonald | 260—67 |
| 2,920,065 | 1/1960 | Myerholtz et al. | 260—93.55 |
| 2,921,055 | 1/1960 | Heisenberg et al. | 260—89.5 |
| 3,196,142 | 7/1965 | Best | 260—94.2 |

WILLIAM H. SHORT, *Primary Examiner.*

JOSEPH R. LIBERMAN, *Examiner.*

L. M. MILLER *Assistant Examiner.*